Nov. 29, 1949  B. LEVY  2,489,533
PATTERN MILLING MACHINE
Filed Sept. 25, 1946  3 Sheets-Sheet 1

INVENTOR
BARNETT LEVY
By [signature] Atty

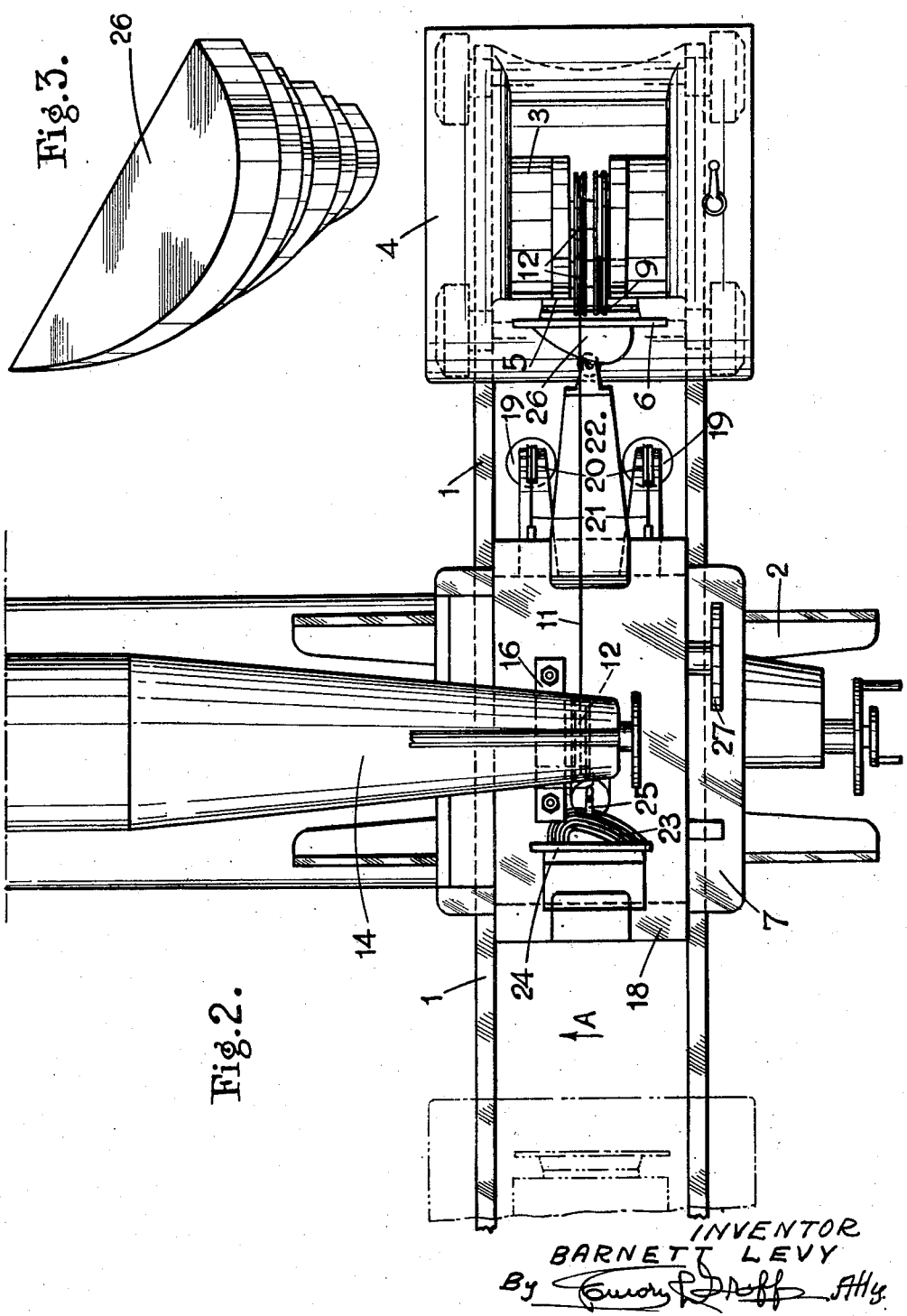

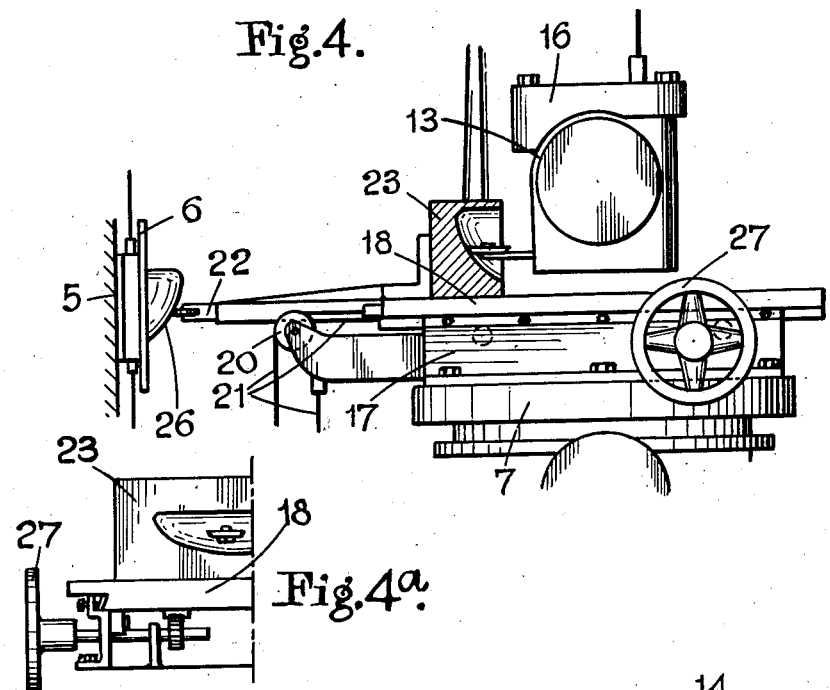
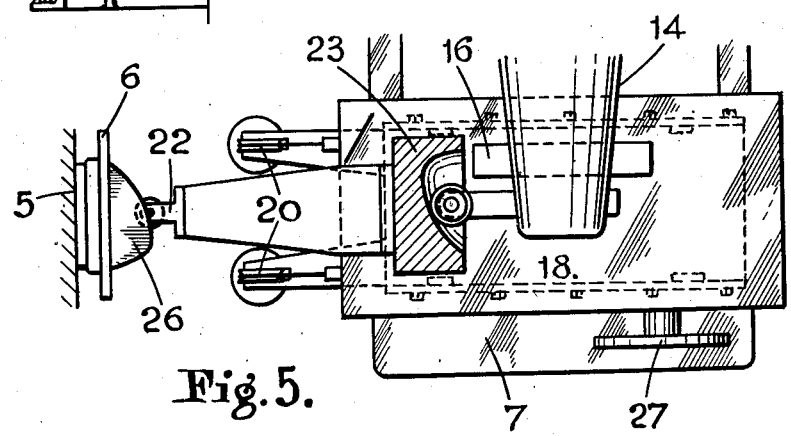

Patented Nov. 29, 1949

2,489,533

UNITED STATES PATENT OFFICE 2,489,533

PATTERN MILLING MACHINE

Barnett Levy, London, England

Application September 25, 1946, Serial No. 699,184
In Great Britain July 9, 1945

Section 1, Public Law 690, August 8, 1946
Patent expires July 9, 1965

8 Claims. (Cl. 90—13.5)

This invention relates to copy-milling apparatus, particularly for use in performing pattern milling and like operations, and has for its principal object to enable copying and reverse copying to be carried out in a simple manner. For example, the invention enables duplicates of a master pattern to be produced with speed and accuracy. By a simple adjustment a "reverse" copy of the pattern can be produced from an external master pattern or from a copy pattern made therefrom, that is, internal three-dimensional profiling can be done, such as making a corebox which follows a similar contour to that of the external master pattern. In this latter case allowance for metal thickness can be automatically made by reverse-copying the master pattern to a smaller scale. That is to say, in one form of the invention, the work-piece can be produced on a scale differing from that of the master pattern. Hereinafter the word "pattern" alone will be used to signify a master pattern which is to be "copied" in producing the work, and the word "pattern" when thus used is not to be confused with the word when denoting a pattern for use in metal casting operations.

The invention embraces a machine tool constructed especially for copy-milling and also copy-milling apparatus for converting an existing milling machine for the copy-milling purposes.

According to the invention a copy-milling machine, suitable for three-dimensional profiling, comprises a carrier for a rotary tool, a main work table slidably adjustable in a horizontal plane, a supplementary work table rectilinearly slidable in a transverse horizontal direction on said main work table, a tracer projecting from the supplementary work table, a pattern table disposed adjacent the work tables, means urging the tracer into contact with a master pattern secured to said pattern table, and means moving the pattern table in a vertical plane synchronously with relative vertical movement between the tool carrier and the supplemental work table. This last-mentioned relative movement would most generally be brought about by raising and lowering the supporting arm of the tool carrier; alternatively the latter may be fixed vertically and the work table raised and lowered.

The copy milling machine according to the invention may be in the form of a self-contained machine tool designed primarily for copy milling purposes or may incorporate some of the components of an existing milling machine.

In order that the invention may be clearly understood a practical embodiment will now be described with reference to the accompanying drawings.

In the drawings:

Figure 2 is a plan view thereof, Figure 3 is a pictorial view of a typical master pattern, and Fig. 4a is a fragmentary end elevation of Fig. 4 with parts thereof removed.

Figures 4 and 5 are fragmentary front and plan views respectively of the set-up employed for performing internal profiling from an external master pattern.

Figure 1:
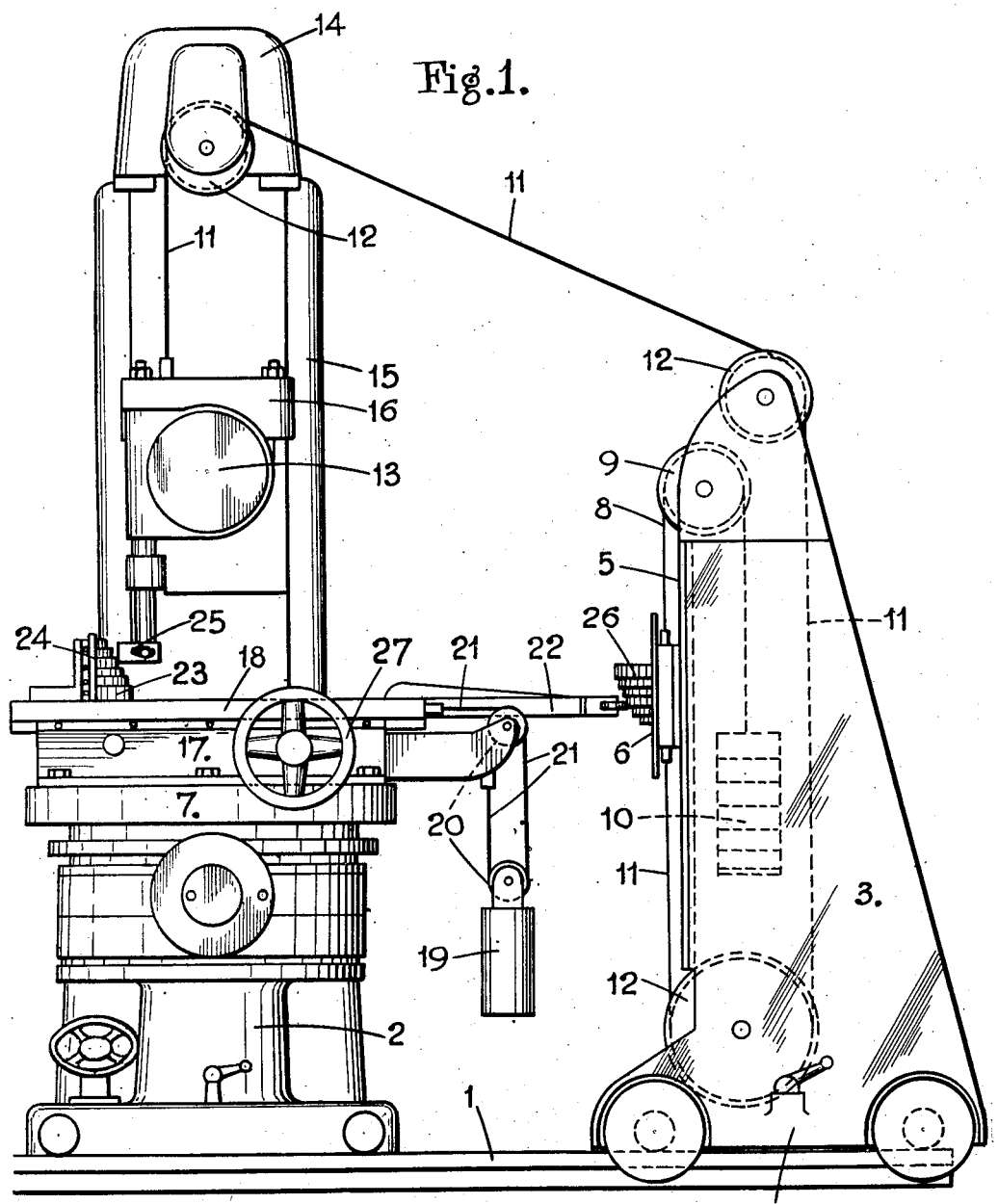
Figure 1 is a front elevation of copy milling apparatus in the form of an attachment for a pattern miller of known form.

In the embodiment illustrated in Figs. 1 and 2, the known machine is provided with a bed plate 1 which extends out from the base 2 of the milling machine and includes a conventional track or guide. Over this bed plate is movably mounted a portable standard in the form of an angle-plate or column 3 standing up from a wheeled base 4. The column 3 has a vertical face 5 which is adapted to carry the pattern table 6 which is slidable thereon. This pattern table may have a rotary adjustment similar to that as commonly applied to the tool slides of a lathe.

The main base 4 of the column 3 may be suitably fastened by cam-action devices, bolts or the like, to the bed plate 1 in such manner as to permit the portable standard and its pattern table 6 to be clamped or otherwise fastened to said bed plate 1 at either side of the existing table 7 of the machine as required. It may also be found necessary on large work to have elongated bolt holes in this additional bed plate, in order that it may be fastened to the floor instead of to the bed of the machine.

The pattern table 6 is suitably counter-balanced by attaching a flexible cable 8 thereto, passing the cable 8 around a pulley 9 and suspending weights 10 on the cable end. The table 6 slides upwards and downwards in a vertical direction on the face 5 of the column 3 of the portable wheeled standard, and is also connected by a flexible inextensible cable 11 passing round a series of pulleys 12, the last of the cable pulleys 12 being rotatably mounted on an overhead bracket 14 secured to the top of the main body frame 15 of the milling machine, and the cable end anchored to a yoke 16 mounted on the tool arm 13, so that the table 6 rises and falls in unison with the vertically moving arm 13. The movement accorded the pattern table 6 may be in the proportion of 1:1 with respect to the movement of the main arm 13, but pantographic or equivalent means (capable of being thrown out of action) may be inserted to bring about increased or decreased movement of the pattern table.

The existing table 7 of the milling machine, which is capable of longitudinal and transverse movements, supports a base table 17 which is thus adjustable as required in a horizontal plane with the table 7, and this base table 17 supports in turn a freely moving supplemental work table 18 (preferably mounted on rollers). The work table 18 is mounted between suitable guides with further rollers to ease side friction, so as to be rectilinearly slidable on the table 17 in a direction normal to the plane of movement of the pattern table 6. The table 18 is urged toward the pattern table 6 by a counter-balance system consisting of weight 19, pulleys 20 and cords 21 secured at opposite ends to the two tables 17 and 18. The table 18 carries a tracer 22 projecting beyond one edge thereof toward the pattern table 6.

An adjustable pantograph device (not shown) may be employed between the sliding work table 18 and the tracer 22 to multiply or reduce the copying action. The pantograph device may have two adjustable pivots and arms to give various ratios preferably in equi-spaced locating holes along the arms of the pantograph, one arm being connected to the sliding work table whilst the remaining free arm carries a tracer roller or point.

Springs of suitable strength may be used instead of the counter-balance system, these being fixed underneath the table and on pantograph arms, if employed, to give the same effect as weights, the tension of springs being adjustable.

The particular form of cutter and work control means illustrated provides a 1 to 1 ratio, that is, the work 23, set up against an angle plate 24 on the table 18, is reproduced by its contact with the revolving cutter 25 to the same size as the pattern 26 on the pattern table 6. With the arrangement of tool and work movement control means shown, in which the work carrying table 18 is of fixed height, the cutter 25 is raised and lowered with the vertically moving main overhanging arm 13 to provide the relative movement required between work 23 and cutter 25, and the pattern table 6 with the pattern 26 moves in unison with the vertically moving cutter 25, the work movement being directionally the same as the cutter movement. Accordingly with the arrangement illustrated the pattern 26 is inverted with respect to the work 23. Where a pair of symmetrically opposite right and left hand articles are required a work piece of one hand may be employed to reproduce a work piece in reverse, that is, of opposite hand by suitably disposing the work in relation to the cutter. It will be evident without detailed description that the flexible connection between the tool arm 13 and pattern table 6 may be arranged so that they move in opposite directions vertically, in which case the work 23 is the same way up as the copy-pattern or master 26.

Suitable adjusting stops (not shown) may be provided on the supplemental work table 18 to regulate the depth of each initial cut, and having adjusted the amount of cut required, the main work table 17 is traversed horizontally and longitudinally with the machine table 7 by means of the existing lead-screw, that is in a line directly parallel with the pattern table 6. Having taken one cut thus, the cutter head 25 is lowered or raised the width of this cut (say approximately a quarter of an inch on coarse work and a fraction of this amount on fine work).

It will be observed that when the cutter 25 is lowered the pattern 26 follows the same line and amount of travel, and thus as the main work table 17 is repeatedly traversed in line with the pattern table 6, the cutting follows the varying contours of the pattern 26 thus producing work of a three-dimensional character. It will be understood from Figure 2 that on moving the tables 7 and 17 together in the direction indicated by the arrow A the work table 18 moves to the right under the influence of the weights 19 in order to maintain the tracer 22 in contact with the contour of the pattern 26. The work 23 is thus urged to the right toward the cutter 25, so that the shape of the work produced is reversed end to end as compared with the pattern 26 and since, as already described, the work 23 is also inverted in respect of the pattern 26, it will be apparent that when working with a 1 to 1 ratio the shape and size of the pattern 26 are identical with the shape and size of the work.

The pattern 26 to be reproduced is shown (see especially Figure 3), by way of example, as made up of a plurality of superimposed flat templates of different sizes which together constitute a pattern of stepped or terraced form and of asymmetrical shape in plan. With an article of this shape there is presented to the tracer 22 a number of right-angular steps in the vertical direction. It will be appreciated, also, that the pattern may include right-angular or other abrupt steps in the horizontal direction, i. e. in the profile following horizontally around one of the steps in the example illustrated. To avoid fouling by the tracer, when the pattern does not give an easy "lead-in," a retracting gear of any suitable construction (not shown in the drawings) is associated with the work-carrying table 18 and is manually controllable by a hand wheel 27.

Figures 4 and 5 of the accompanying drawings illustrate how the apparatus shown in Figures 1 and 2 may be arranged for performing internal profiling from an external three-dimensional master pattern, corresponding references being used in all figures to indicate the same parts of the apparatus. It will be noted that in Figures 4 and 5 the portable standard 3 with its vertical face 5 has been moved to the left-hand side of the milling machine (compare the position indicated by chain-dotted lines on the left-hand side of Figure 2). The table 18 is also reversed end to end as compared to the position shown in Figure 2 to bring the tracer 22 adjacent to the pattern table 6 and the position of the operating handle 27 in relation to said table 18 so that although the table is reversed the handle 27 is still situated at the front of the table. The work 23, which is to be internally profiled, is represented in section for clearness and, with the angle plate 24, is mounted on the left-hand side of the table 18 so that the counterweights 19 tend to pull the work away from the cutter 25, which latter, for convenience, may be arranged as shown with its main spindle horizontally disposed. It will also be realized on comparing the relative elevational position of the work 23 and pattern 26 shown in Figure 4 with the relative elevational position of the work 23 and pattern 26 shown in Figure 1, that the relative direction of vertical movement of the tool-carrying arm 13 and the pattern table 6 needs to be reversed to that required for the set-up shown in Figure 4, and it will be readily understood without further description in what manner the cable 11 and its supporting pulleys are required to be arranged to produce the vertical movement in the same direction of the arm 13 and pattern table 6.

The introduction of the pantograph action will enable the same operation as above described to be performed, with the additional variation of ratios according to the manner in which the pantograph arms are preadjusted.

A further typical method of producing three-dimensional work in accordance with the invention is by means of a single flat template instead of a full three-dimensional pattern.

In this connection it will be supposed, by way of example, that it is required to produce a semi-circular channel in a solid block of material. A flat template, say a quarter of an inch thick, is prepared and fastened to the pattern table 6 and at right angles thereto. The block of material to be worked is now fastened to the work table 18 in the ordinary manner, and the tracer 22 allowed to contact the contour-edge of the template.

It should be noted that the template is precisely the same size as the internal measurements of the channel to be cut when working on a 1 to 1 ratio or without pantograph device.

The work tables 17, 18 are now traversed in the manner previously described, the cutter 25 similarly being lowered or raised as before, but in this instance the connection between cutter 25 and pattern table 6 is disconnected, the pattern 26 being locked in permanent position for the duration of this job so that a true, parallel, semicircular channel is cut into the block of material on the work table 18. It will be apparent from the above description that the work is moving to a predetermined shape at each cut, the cutter following a straight path upwards or downwards, the pattern being constant through the tracer roller following the template-shape the whole time.

I claim:

1. A copy-milling machine comprising a carrier for a rotary tool, a main work table slidably adjustable in a horizontal plane, a supplementary work table rectilinearly slidable in a transverse horizontal direction on said main work table, a tracer projecting from the supplementary work table, a pattern table disposed adjacent the work tables, means urging the tracer into contact with a master secured to said pattern table, means for moving the pattern table in a vertical plane synchronously with vertical movement of the tool carrier, and means for maintaining the tracer of the supplementary work table in contact with the pattern on the pattern table.

2. A copy-milling machine according to claim 1 and wherein the second means connects the vertically movable pattern table to the vertically movable tool carrier so that the vertical movements of said pattern table and tool carrier are effected in unison in the same direction.

3. In combination with a milling machine having a movable tool carrying arm supporting a rotary tool, copy-milling apparatus comprising a base table supported on the milling machine table and adjustable therewith in a horizontal plane, a supplementary work-carrying table rectilinearly slidable on said base table in a direction at right angles to the traverse of the base table, said work table carrying a projecting tracer element, a standard ranged alongside of the milling machine, a vertically slidable table on said standard for supporting the master pattern, tension means for sliding the work carrier to maintain the tracer element in contact with the master on the pattern table and means connecting the vertically movable tool carrier to the pattern table to co-ordinate the vertical movements of the tool carrier with those of the pattern table.

4. The combination according to claim 3 and wherein the last mentioned means connects the vertically movable pattern table to the vertically movable tool carrier so that the vertical movements of said pattern table and said tool carrier are effected in unison in the same direction.

5. The combination, according to claim 4, and also comprising an overhead bracket assembly securable to the body frame of the milling machine, said last means comprising a flexible inextensible connector attached to the pattern table and supported and guided by the bracket, means suspending said movable main tool-carrying arm from the connector, and weight means connected to the pattern table to counter-balance through the intermediary of the connector the weight of the tool arm.

6. A copy-milling apparatus according to claim 3 and also comprising an overhead bracket assembly securable to the body frame of the milling machine, a flexible inextensible connector attached to the pattern table and supported and guided by the bracket, means suspending said movable main tool-carrying arm from the connector, and weight means connected to the pattern table to counter-balance through the intermediary of the connector the weight of the tool arm.

7. The combination of claim 6, and wherein a railed track extends out from the milling machine base for movably supporting the standard and for guiding said standard in relation to said machine base and said standard comprises a wheeled base supporting an upright column upon a face of which the pattern table is vertically slidable under the opposing influence of said counter-balance weight and a flexible inextensible cord connecting the pattern table to the vertically movable tool arm.

8. The combination of claim 3, and wherein a railed track extends out from the milling machine base for movably supporting the standard and for guiding said standard in relation to said machine base and said standard comprises a wheeled base supporting an upright column upon a face of which the pattern table is vertically slidable under the opposing influence of a counter-balance weight and a flexible inextensible cord connecting the pattern table to the vertically movable tool arm of a vertical milling machine.

BARNETT LEVY.

REFERENCES CITED

The following references are of record in the file of this patent:

UNITED STATES PATENTS

| Number | Name | Date |
|---|---|---|
| 1,197,896 | Blaisey | Sept. 12, 1916 |
| 1,667,153 | Heymann | Apr. 24, 1928 |
| 1,750,885 | Goetz | Mar. 18, 1930 |
| 1,960,757 | Shaw | May 29, 1934 |
| 2,059,505 | Wright | Nov. 3, 1936 |
| 2,182,551 | Edwards | Dec. 5, 1939 |

FOREIGN PATENTS

| Number | Country | Date |
|---|---|---|
| 66,064 | Germany | Dec. 12, 1892 |